Oct. 24, 1939.   R. S. BLOUGH   2,177,052
TOGGLE LEVER DEVICE FOR WASHING MACHINES
Filed July 31, 1937   2 Sheets-Sheet 1

Inventor:
Ronald S. Blough.
By:- Tefft + Tefft
Atty.

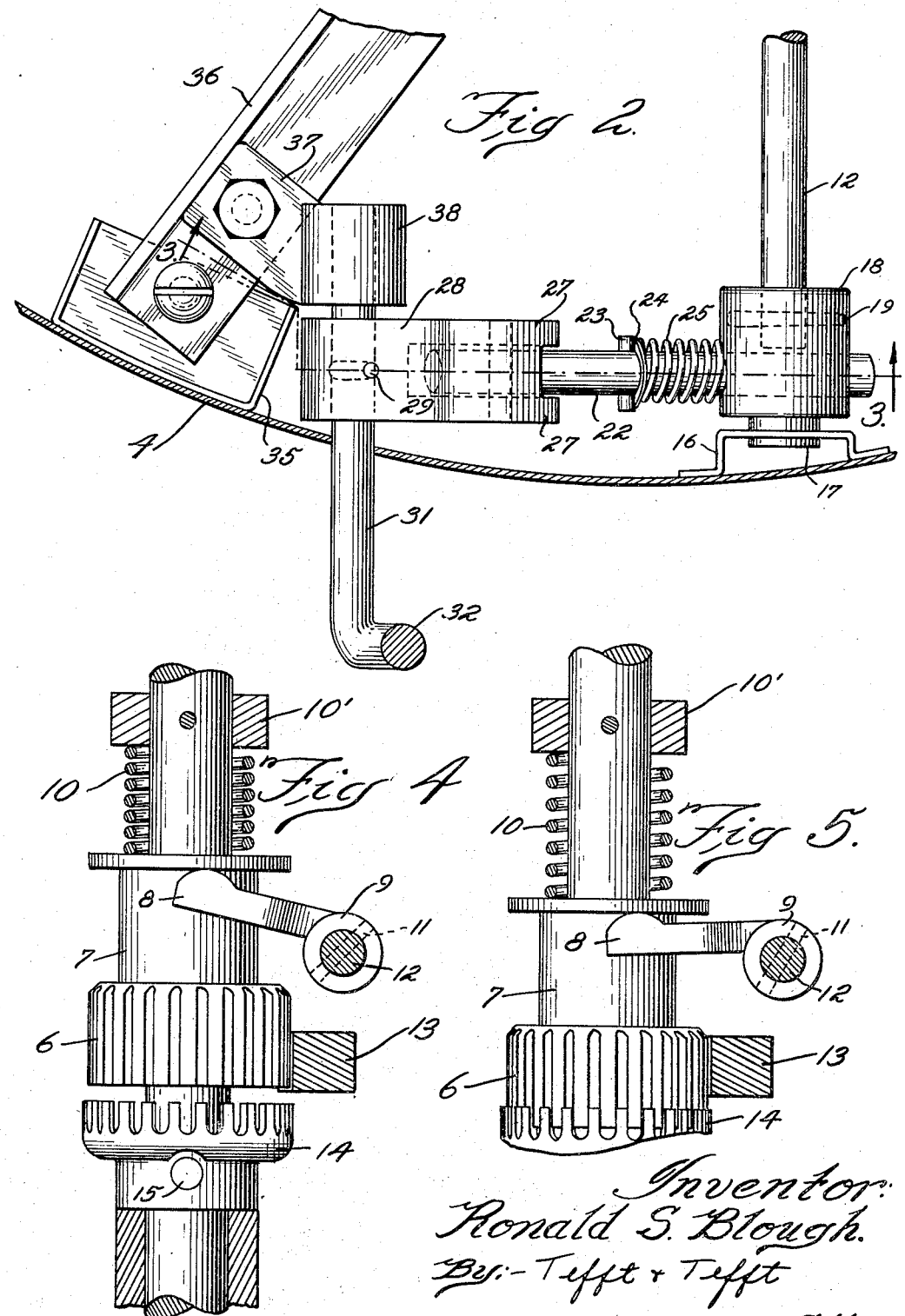

Patented Oct. 24, 1939

2,177,052

UNITED STATES PATENT OFFICE 2,177,052

TOGGLE LEVER DEVICE FOR WASHING MACHINES

Ronald S. Blough, Fairfield, Iowa, assignor to The Dexter Company, Fairfield, Iowa, a corporation of Iowa Application July 31, 1937, Serial No. 156,678

3 Claims. (Cl. 192—99)

This invention pertains to washing machine clutch operating devices and more particularly to a manually operable snap-action toggle mechanism adapted quickly and easily to connect or disconnect the clutch elements between a driving part and a driven part, such as the motor and the washing dolly, of a washing machine.

The objects of the invention include, the provision of a simple and economical mechanism for quickly engaging and disengaging clutch elements and with a minimum of effort on the part of the operator; the provision of a mechanism of sturdy and strong construction and one which will withstand considerable abuse; the provision of mechanism which will positively clutch and declutch the driving and driven parts; and the provision of mechanism which will positively hold the clutch elements in their engaged position or disengaged position, as the case may be.

Many other objects as well as the advantages and uses of the invention will become apparent after reading the following description and claims and after viewing the drawings in which:

Fig. 2 is a section taken substantially along the line 2—2 of Fig. 1.

Fig. 4 is a vertical elevation of the washing machine clutch shown in Fig. 1 looking at the same substantially from the line 4—4 of Fig. 1 and Fig. 5 is an elevational view of a fragment of Fig. 4 showing the clutch engaged.

Figure 1:
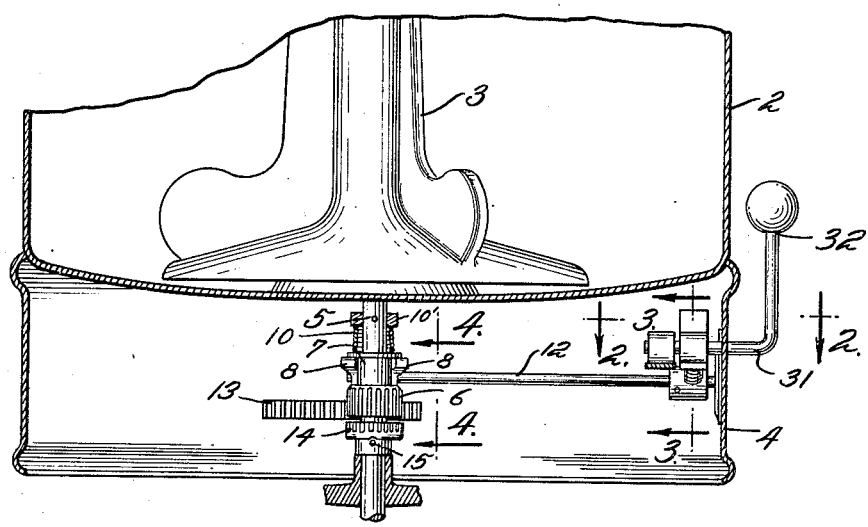
Fig. 1 is a section in vertical elevation through a portion of a washing machine showing a preferred embodiment of the invention incorporated therein.

The washing machine more or less conventionalized in Fig. 1 comprises a tub portion 2 in which is a more or less conventional dolly 3 and from which depends a skirt 4. The dolly 3 is attached to a shaft 5 on which a combined pinion and clutch member 6 is rotatably and slidably mounted. Attached to or integral with the clutch member 6 is a flanged collar 7 adapted to be engaged by the forked arms 8 of a clutch shifting member 9 secured as by a pin 11 to a rock shaft 12. A spring 10, compressed between the flanged collar 7 and a collar 10' fixed by a pin to shaft 5 normally urges the collar 7 and combined pinion and clutch member 6 toward and into clutching engagement with a second clutch member 14 which is secured to shaft 5 as by pin or set screw 15. A rack 13 is driven by mechanism not shown and since it is in constant engagement with pinion 6, it is adapted to drive the shaft 5 and the dolly 3 when the clutch teeth of members 6 and 14 are inter-engaged as shown in Fig. 5.

A bracket 16 secured in any suitable manner, as by welding, to the skirt 4 provides a bearing for a hub portion 17 of a collar 18 which is pinned to the shaft 12 by a pin 19. The mounting of the hub 17 and the bracket 16 supports this end of the shaft 12 while the other end thereof finds what support it may need from the engagement of the clutch shifting member 9 with collar 7 but if desired an additional bearing bracket may be secured to the bottom of the tub 2 or otherwise to provide the necessary support for the inner end of rock shaft 12.

The collar 18 is bored through transversely on a diameter as shown at 21 slidably to receive a bar or rod 22 therethrough. Intermediate the ends of the bar 22 is a pin 23 against which a washer 24 is disposed as an abutment for a compression spring 25, the opposite end of which rests and abuts against the collar 18. It is preferable to have the spring 25 under a reasonable amount of compression in its extreme positions. The opposite end of the bar 22 is pivoted upon a pivot pin 26 secured between the sides 27 of a casting 28 which in turn is secured as by pin 29 to a portion of one arm 31 of an operating handle 32. The casting 28 is provided with inwardly directed projections 33 equidistant from the pivot 26 for the purpose of limiting the angular movement between the end 34 of bar 22 with respect to the pivot 26. The reason for this arrangement will appear hereinafter. A second bracket 35 welded or otherwise secured to the skirt 4 supports a stay member 36 which in turn carries a bracket 37 with which a journal 38 may be made integral or may be secured thereto in any other manner. The journal 38 rotatably supports the inner end of the arm 31 of the handle 32; the skirt 4 being cut away to permit passage of the arm 31 from the exterior to the interior of the skirt.

Figure 3:
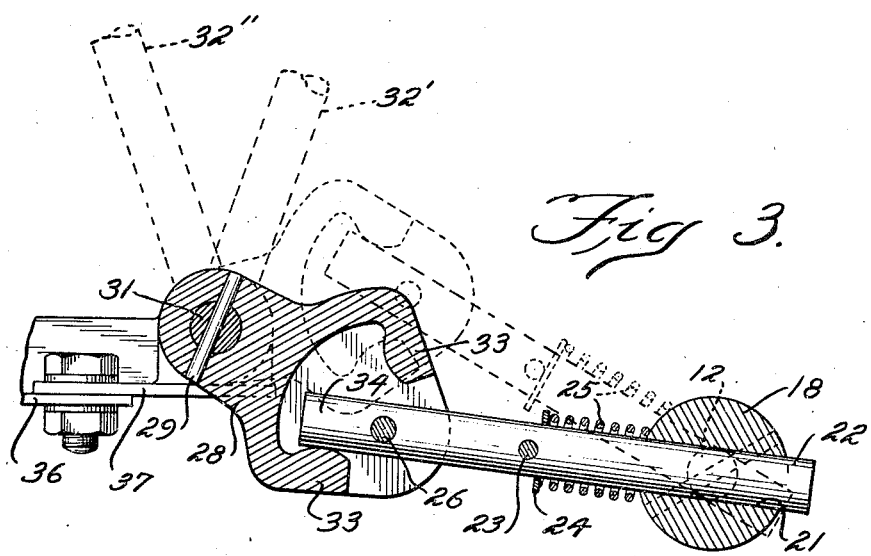
Fig. 3 is a section taken substantially along the line 3—3 of Fig. 1.

When it is desired to release the clutch the operator moves the handle 32 to the left viewing Fig. 2 or upward from the plane of the paper viewing Fig. 1. This movement shifts the hand lever from position 32' to position 32" shown in Fig. 3 and moves the casting 28 from the full line position to the dotted line position shown in the same figure compressing the spring 10 as shown in Fig. 4. During the course of this movement the axis of pivot 26 moves closer to the axis of shaft 12 which causes the bar 22 to slide farther through the bore 21, and the spring 25 compresses to a maximum compression when the axes of pivot 26 and shafts 12 and 31 are substantially in line. As soon as the axis of pivot 26 passes dead center with respect to the axes of shafts 12 and 31, the force of spring 25 will immediately snap the casting 28 to the dotted line position shown in Fig. 3 and simultaneously will complete the rotation of the shaft 12 to effect the disengagement of the clutch teeth of members 6 and 14. The reverse action is similar and serves to re-engage the clutch members 6 and 14 by its instantaneous snap-action, but the stops 33 limit the throw of the shaft 12 in either direction.

The arrangement thus provided is sturdy and strong and will permit considerable abuse without danger of any material injury for it is practically impossible for anyone to do any harm to the clutch members because the relatively short lever arm between the pivot 26 and end portion 34 of bar 22 does not admit of the transmission of injurious effort to the clutch parts. If one were to attempt to force the operating handle 32 beyond its proper position in either direction, the handle would bend or break or, pin 29 or pivot pin 26 would shear before the excess force could be transmitted to the clutch parts. Furthermore, the snap-action provided by the mechanism not only serves instantaneously to clutch or de-clutch the clutch elements or the driving and driven parts, but will positively hold the clutch elements in their engaged or disengaged positions. A minimum of effort on the part of the operator is required.

While a preferred embodiment of the invention has been illustrated and that embodiment has been depicted in connection with mechanism for driving a washing machine dolly, it will be appreciated that the invention is of broader application in that many variations and changes may be made therein and it may be applied in other relationships, all without departing from the spirit of the invention and the scope of the appended claims.

I claim:

1. In a washing machine a clutch operating mechanism comprising, a support, a rock shaft mounted for rocking movements in said support, said shaft having a clutch shifting element at one end, a bar having one end associated with said shaft for sliding movements transversely of the axis thereof, said bar and shaft being arranged to rock together, bar operating means pivotally mounted upon said support on an axis substantially parallel to the axis of said shaft, a pivot connection between the other end of said bar and said means, said pivot connection providing a pivot axis substantially parallel to said shaft axis, an abutment on said bar between said pivot connection and said shaft, a compression spring between said abutment and said shaft, and means for rocking said bar operating means about its pivot.

2. In a washing machine a clutch operating mechanism comprising, a support, a clutch operating rock shaft journaled in said support for rocking movements between positions of clutch engagement and clutch disengagement, a toggle element having one end associated with said shaft for sliding movements transversely thereof and for rocking movements therewith, an abutment carried by said toggle element, a compression spring between said abutment and said shaft and normally tending to urge said abutment from said shaft, a second toggle element pivotally mounted on said support on an axis substantially parallel to the axis of said shaft, a pivot connection between said second toggle element and the other end of the first said toggle element, means carried by the toggle elements for limiting the movement of the elements relatively about said pivot connection, and an operating handle connected with said second toggle element for swinging the same on its pivot mounting.

3. In a washing machine clutch control mechanism, a manually operable dual position handle lever, a lever arm pivotally connected to said lever for movement between said dual positions, interlock means in said lever arm limiting the movement of said arm, a clutch control shaft rockably connected to said lever arm by a sliding connection, and a spring stressed by relative movement of the lever arm and clutch control shaft to effect quick throw of the control mechanism between the two clutch positions and to firmly hold the mechanism in either of the two positions.

RONALD S. BLOUGH.